United States Patent [19]

White

[11] Patent Number: 5,838,858

[45] Date of Patent: Nov. 17, 1998

[54] FIBER OPTIC CONNECTION UNIT

[75] Inventor: Rowland S. White, Lumenburg, Mass.

[73] Assignee: Molex Incorporated, Lisle, Ill.

[21] Appl. No.: 852,484

[22] Filed: May 7, 1997

Related U.S. Application Data

[60] Provisional application No. 60/017,464, May 14, 1996.

[51] Int. Cl.⁶ .................................................. G02B 6/36
[52] U.S. Cl. .............................. 385/76; 385/86; 385/135
[58] Field of Search ....................... 385/76, 86, 134–139

[56] References Cited

U.S. PATENT DOCUMENTS

| | | | |
|---|---|---|---|
| 4,874,904 | 10/1989 | DeSanti | 174/53 |
| 4,960,317 | 10/1990 | Briggs et al. | 350/96.21 |
| 4,976,510 | 12/1990 | Davila et al. | 350/96.2 |
| 5,071,211 | 12/1991 | Debortoli et al. | 385/76 |
| 5,572,617 | 11/1996 | Bernhardt et al. | 385/135 |

*Primary Examiner*—Phan T. H. Palmer
*Attorney, Agent, or Firm*—A. A. Tirva

[57] ABSTRACT

An optical fiber connection unit has an aperture for mounting to a standard electrical box so that the unit can replace an electrical outlet (power or tele-communications). The unit has a peripheral wall having flanges for easy retention of optical fibers within the unit prior to affixing a cover plate. The cover plate and peripheral wall have discontinuities for passage of optical fibers at the bottom of the unit to connect to optical modules therein. The cover plate has an aperture to allow a standard electrical module to be mounted thereto for provision of both optical and electrical connection.

13 Claims, 5 Drawing Sheets

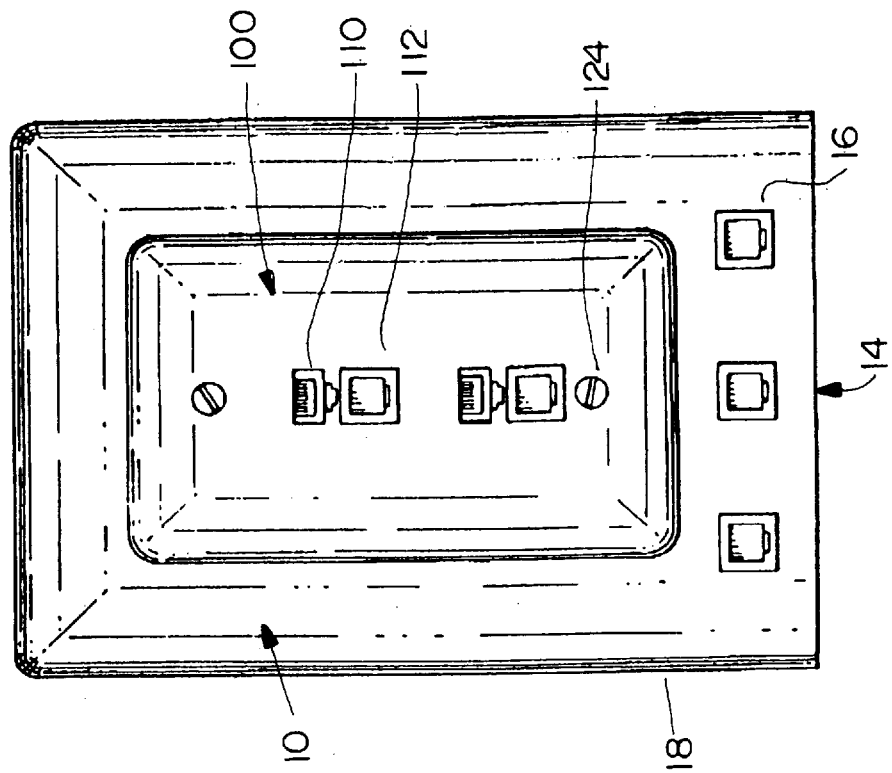
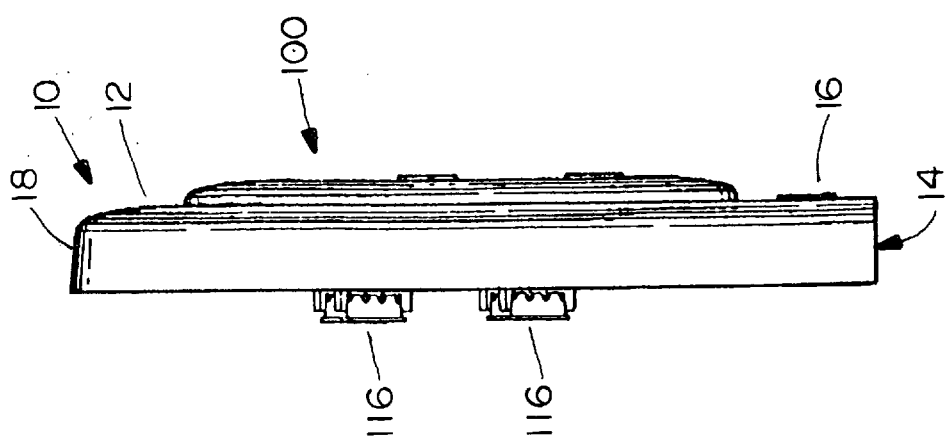

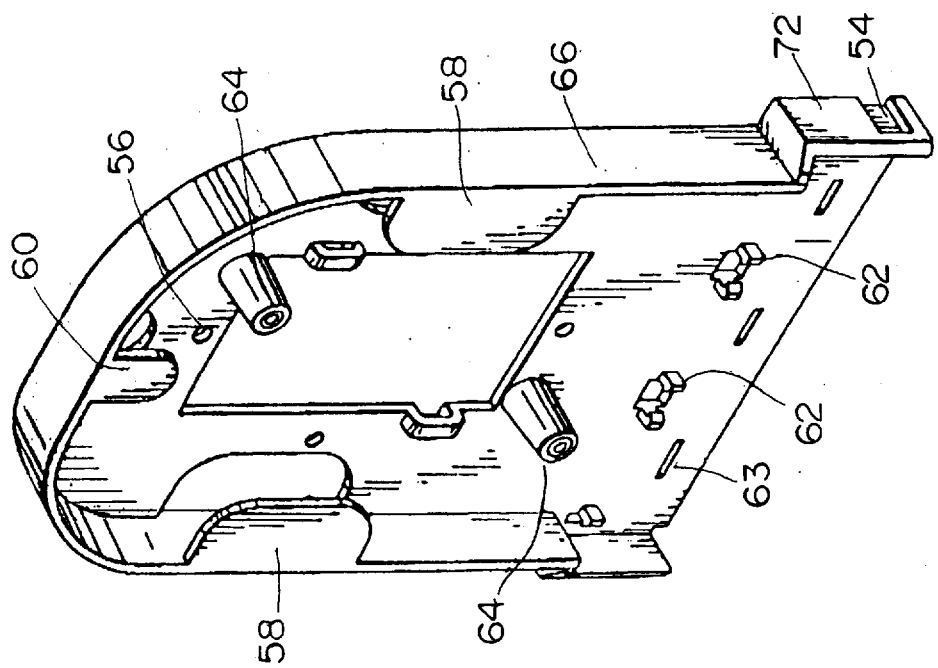
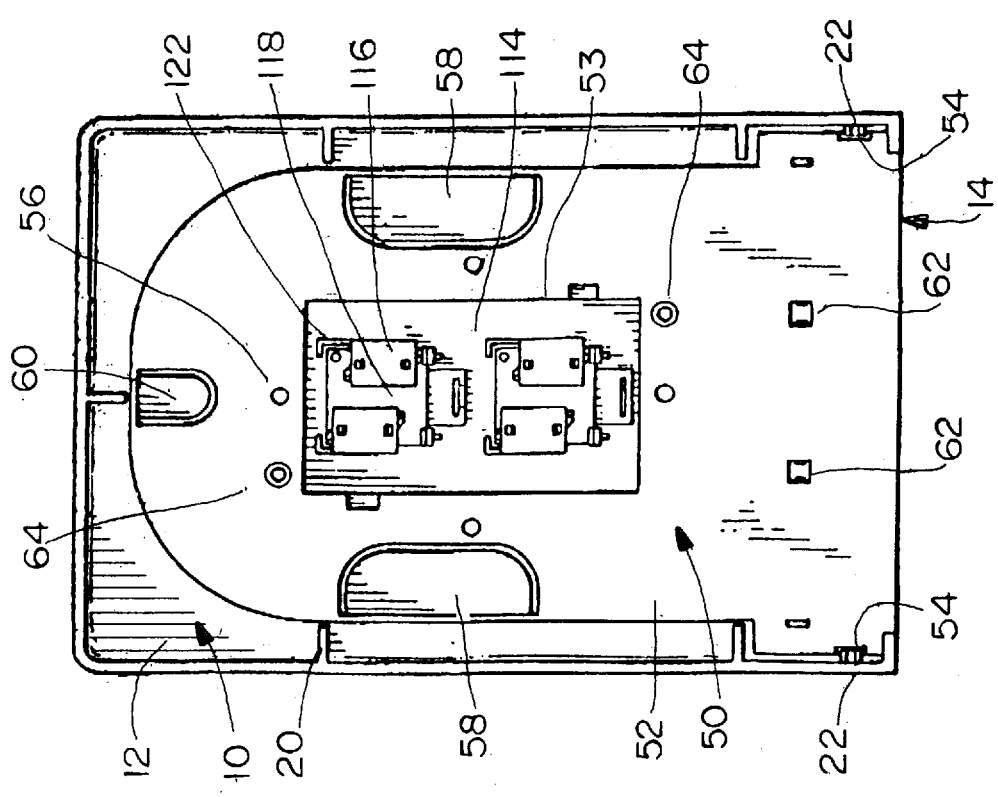
FIG.4
FIG.3

FIBER OPTIC CONNECTION UNIT

FIELD OF THE INVENTION

This application claims priority of a copending provisional application Ser. No. 60/017,464 filed May 14, 1996. The invention relates to connection units for optical fibers, and particularly to a wall or surface mounted outlet for optical fibers forming part of a wiring system in a building.

BACKGROUND OF THE INVENTION

Traditional communications systems within a building have been based around electrical wiring and connectors. Increasingly, however, fiber optics will be used as the transmission medium in telecommunications systems. Fiber optics are well known in telephone networks, but are rare in cabling systems providing communications to desktop equipment. At present, outlets for electrical power or electrical telecommunications are made to a conventional size and configuration. Accordingly, current fiber optic connectors have also been made to the conventional size of electrical and telecommunications outlets. However, such prior art fiber outlets do not provide satisfactory termination of optical fibers.

A typical prior art optical fiber outlet, specifically for optical fibers rather than adapted from prior conventional outlets as described above, comprises a steel case of dimensions 50 mm depth, 200 mm height and 150 mm width.

Such prior art outlets are inelegant, are not conveniently mounted flush to a wall or other surface and are consequently prone to damage.

We have appreciated that a connection unit for an optical fiber system should be capable of storing excess optical fiber without bending the fiber by more than the minimum bend radius, should not allow laser light to scatter into a room and should be conveniently used in conjunction with electrical power or telecommunications outlets.

One prior art connection unit is disclosed in U.S. Pat. No. 4,976,510 to Davila et al. The disclosed communications outlet includes a central opening about which is arranged a wall forming a storage area for optical fibers.

U.S. Pat. No. 4,874,904 to DeSanti discloses a wall outlet box in which an insert between a mounting box and a face plate is provided and which carries a race way around which an optical fiber can be stored.

SUMMARY OF THE INVENTION

An optical fiber connection unit comprising a base plate and a cover plate; said base plate comprising:
a rear wall for mounting to a surface, said rear wall defining an aperture for passage of optical fibers into the unit; and a peripheral wall on said rear wall, said peripheral wall having: (a) at least one retaining means protruding therefrom for retaining optical fibers arranged on said rear wall and within said peripheral wall, (b) at least one discontinuity to allow connection to fibers retained in the unit in use, and (c) a curved portion having a radius of curvature corresponding to a minimum radius of curvature of an optical fiber; said cover plate comprising: an outer face for mounting to said base plate and defining a second aperture for reception of an electrical outlet module, wherein said base plate and said cover plate define an enclosure for retaining fibers therein for connection, said first aperture and said second aperture allow the unit to be mounted to an electrical outlet box and to have an electrical connector module mounted thereto respectively, and said aperture defined by said rear wall, said outer face and said discontinuity of said peripheral wall allows connection to said optical fibers.

In one aspect of the invention there is provided an optical fiber connection unit comprising a base plate and a cover plate; said base plate comprising: a rear wall for mounting to a surface, said rear wall defining an aperture for passage of optical fibers into the unit; and a peripheral wall on said rear wall, said peripheral wall having at least one retaining means protruding therefrom for retaining optical fibers arranged on said rear wall and within said peripheral wall, said peripheral wall having a curved portion having a radius of curvature corresponding to a minimum radius of curvature of an optical fiber; wherein said base plate and said cover plate define an enclosure for retaining fibers therein for connection.

This aspect of the invention provides the facility to easily mount the unit to a surface and pass optical fibers into the unit from the rear without violating the minimum bend radius. Preferably, the at least one retaining means comprises at least one flange which provides easy retention of fibers which form a loop on the rear wall, bounded by the peripheral wall and retained by the at least one flange. The cover plate is then easily mounted to complete the connection unit.

In a preferred embodiment of this aspect of the invention, said aperture defined by said rear wall is suitable for location of the unit over a standard electrical box. This provides the convenience that fibers may be routed to a standard electrical outlet and retained within the unit of this aspect of the invention.

The invention also provides an optical fiber connection unit comprising a base plate and a cover plate; said base plate comprising: a rear wall for mounting to a surface, said rear wall defining an aperture for passage of optical fibers into the unit; and a peripheral wall on said rear wall having at least one discontinuity to allow connection to fibers retained in the unit in use wherein said base plate and said cover plate define an enclosure for retaining fibers therein for connection through an aperture defined by said rear wall, said outer face and said discontinuity of said peripheral wall; wherein said peripheral wall has a curved portion having a radius of curvature corresponding to a minimum radius of curvature of an optical fiber.

The arrangement provides easy connection to the fibers within the unit and, since the connection is made through an aperture in the side of the unit through the peripheral wall, rather than the front of the unit, there is a reduced risk that stray laser light could scatter into a room in which the unit is used. Preferably, said discontinuity in said peripheral wall defining said aperture will be at the bottom of the unit in use. This ensures that any stray laser light is scattered harmlessly towards the floor of a room.

In another preferred feature, said rear wall additionally comprises at least one retainer for retaining a connection module. The connection module is mounted at the lower end of said rear wall in its use position, adjacent said aperture. Connection to a fiber within the unit is thus made by connection of the stored fiber to one part of the connection module, and connection of the other fiber to a second part of the connection module through the aperture.

The invention also provides an optical fiber connection unit comprising a base plate and a cover plate; said base plate comprising: a rear wall for mounting to an electrical outlet box, said rear wall defining an aperture for passage of optical fibers and electrical conductors into the unit; and a peripheral wall on said rear wall, said peripheral wall having a curved portion having a radius of curvature corresponding to a minimum radius of curvature of an optical fiber; wherein said cover plate comprises an outer face for mounting to said base plate and defining a second aperture for reception of an electrical outlet module, wherein said base plate and said cover plate define an enclosure for retaining fibers therein for connection, and said first aperture and said second aperture allow the unit to be mounted to an electrical outlet box and to have an electrical connector module mounted thereto respectively.

This aspect of the invention enables the whole unit to be attached to a standard electrical box (for power or communication connection) and to have an electrical module mounted thereto, providing both electrical and fiber optic connection in a single unit in place of electrical connection only. The electrical module is connected to wires routed to the electrical box through the first and second apertures of the unit, and a connector may be connected to the electrical module at the front of the unit. The optical fibers are stored in the enclosure surrounding the electrical module.

BRIEF DESCRIPTION OF DRAWINGS

An embodiment of the invention in its various aspects, will now be described, by way of example, and with reference to the accompanying drawings in which:

FIG. 1 is a side view of the assembled connection unit;

FIG. 2 is a front view of the assembled connection unit with an electrical module in place;

FIG. 3 is a rear view of the assembled unit with an electrical module in place;

FIG. 4 is a perspective view of the base plate;

Figure 6:
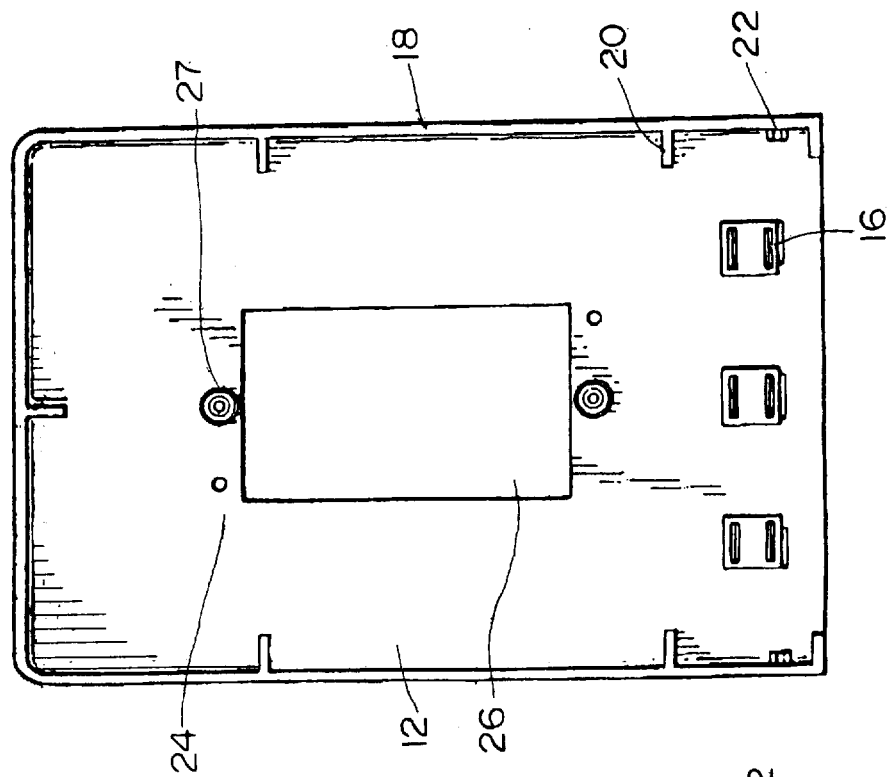
FIG. 6 is a rear view of the cover plate.

The assembled unit is shown in FIGS. 1 and 2 and comprises a cover plate 10 having an outer face 12 and an outer side wall 18. The outer side wall does not extend all the way around the outside of the unit, leaving an open side defining an aperture 14 for passage of optical fibers. Icon holders 16 allow icons to be displayed on the front of the unit indicating the nature of the connection that may be made to one of three fiber connectors accessible through the fiber aperture 14. The unit may be made from a suitable plastics material.

The unit is shown with an electrical module 100 in place having a front face 114, sockets 110 for electrical connectors and icon holders 112 for displaying a label or icon indicating the type of socket. Insulation displacement connectors 116 are attached at the rear of the electrical module 100 for connecting wires to the sockets 110. In the situation that no electrical connection is required, the electrical module 100 could be replaced by a blanking plate, or the cover plate 10 itself could form a continuous cover. Although a communications type electrical connector is shown, the unit may equally be used with an electrical power socket.

Further details of the assembled unit are shown in the rear view of FIG. 3. The rear of the cover plate 10 can be seen comprising the outer face 12 and the outer side wall 18 extending along three sides of the unit leaving the optic fiber aperture 14. Reinforcing features 20 of the cover plate 10 can also be seen.

The rear of the electrical module 100 shows insulation displacement connectors 116 having stuffer caps 117 in place and mounted on PCBs 118 which establish electrical connection with the electrical sockets 110 shown in FIG. 2. This allows termination of wires to the IDCs 116 for connection to a plug inserted into one of the sockets 110. The PCBs are retained in position by guiding walls 122 and spring tabs 120. The rear of the label holders 112 can also be seen. The insulation displacement connectors may be of the type disclosed in WO 92/22941.

The base plate 50 comprises a rear wall 52 defining an aperture 53 through which fiber optic strands may pass. Notches 54 (best seen in FIG. 4) in the sides of the rear wall 52 cooperate with teeth 22 of the outer side walls 18 of the cover plate to hold the cover plate 10 and base plate 50 together. In addition, screws pass through the front of the cover plate and attach to screw posts 64 seen from the rear in this figure. Screw holes 56 allow the base plate to be attached to an electrical outlet box. A pair of flanges 58, 60 can be seen through holes in the base plate, but are best described with reference to FIGS. 10 and 11.

Figure 10:
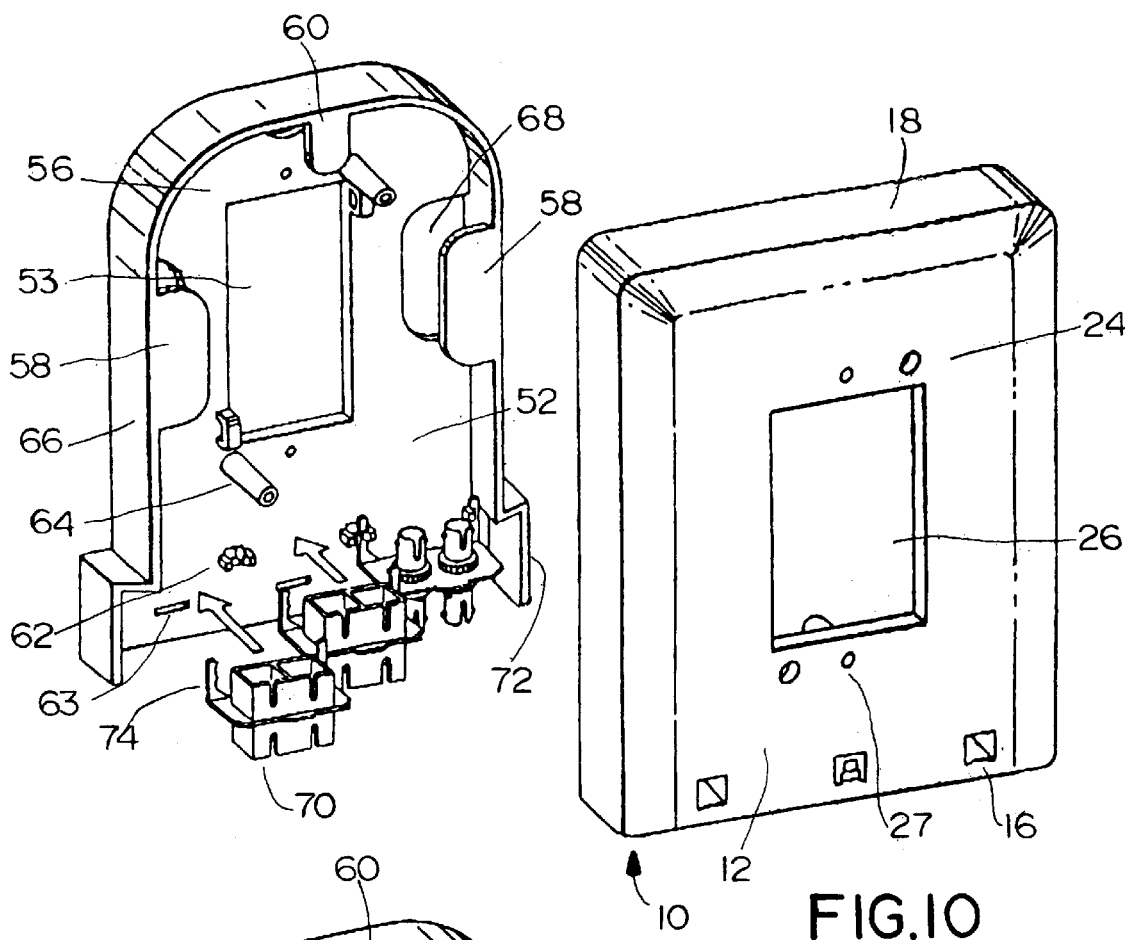
FIG. 10 is a perspective view of the base plate and cover plate showing fiber optic connection modules.
Figure 11:
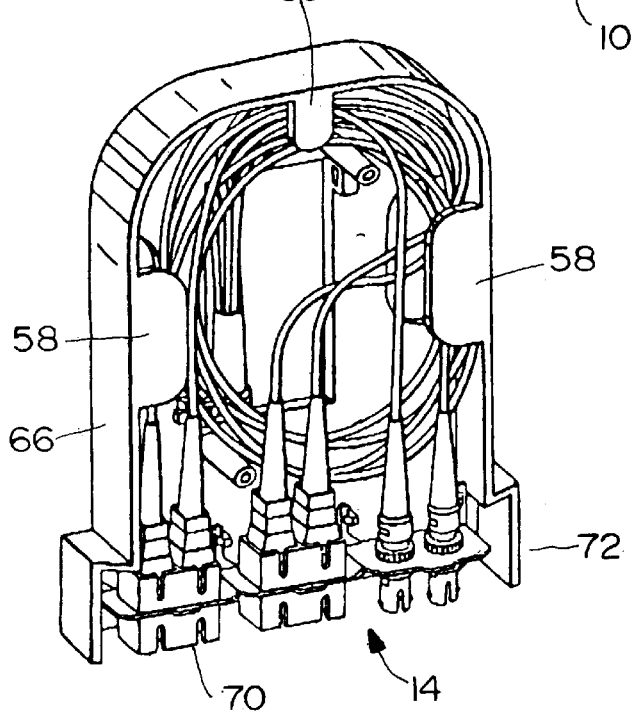
FIG. 11 is a perspective view of the base plate showing coiled optical fibers in place connected to fiber connection modules.

Turning now, to FIGS. 10 and 11, the front of both the base plate and cover plate is shown and it can be seen how the cover plate fits over the base plate to produce the fully assembled unit previously described. The base plate has an aperture 53 which allows optical fibers and electrical wires to pass into the unit from the rear. Advantageously, the aperture is dimensioned to fit a standard electrical outlet box, and screw holes 56 are provided at the conventional spacing for an electrical box. Consequently, an existing electrical outlet module (power or telecommunications) may be removed and replaced with the unit which can provide both electrical and optical outlets.

The side flanges 58 and upper flange 60 can be seen protruding from the peripheral wall 66. The flanges provide a means for retaining the optic fibers in position. Other arrangements will achieve the desired function and will occur to those skilled in the art. The flanges are spaced from the rear wall 52 providing a gap therebetween. Apertures 68 are formed as part of the moulding process to produce the flanges 58, 60, but are not necessary for the flanges to function. The fibers routed to the electrical box pass through the aperture 53 into the unit and are coiled as shown in FIG. 11. The peripheral wall 66 guides the fibers in a curve, and the fibers are neatly retained in position by the side flanges 58 and upper flange 60. The flanges thus provide easy management of the optical fibers and allow a length of fiber to be coiled without requirement for any additional fixing. Advantageously, a portion of the peripheral wall 66 is curved to guide the fibers in a loop, and has a radius of curvature such that the minimum bend radius (1.5") is not violated. The combination of the flanges 58, 60, the aperture 53 and curved peripheral wall 66 allows an electrical outlet to be replaced by a fiber outlet providing correct fiber storage and convenience.

To connect equipment via optical fibers to the unit, up to three fiber connection modules, such as SC or ST modules, may be fitted to the base plate and secured by retaining means such as tabs 62. Four retainers 62 are provided; the outer two having a single sprung tab, and the center two having a pair of tabs. Arms 74 on the modules 70 are received in the retaining tabs 62 to secure the modules in position, and protrusions on the modules fit into slots 63. A wider portion 72 of the base plate 50 is provided to allow room for the modules 70. Turning again to FIG. 11, the termination of the fibers to the modules 70 in their fitted position can be seen. Each module has facility for connector of two fibers. Once the cover plate is positioned over the base plate, the discontinuity in the peripheral wall 66, defining the fiber aperture 14, allows fibers to be connected to the modules on the opposite sides from the fibers within the unit. The connection unit 10, once assembled, thus provides up to three outlet modules for connection of optical fibers and correct storage of fibers to be connected within the module. The termination of the fibers points downwards having the advantage that any stray laser light will be directed to the floor of the room in which the unit is used, rather than projected into the room. This is a useful safety feature for a laser product.

Returning to FIG. 10, the fitting of the cover plate 10 to over the base plate 50 will now be explained. The cover plate with the outer face 12, outer side wall 18 (as previously described with reference to FIGS. 1 and 2) and fixing holes 24 which allow the passage of two screws through to screw posts 64 to secure the cover plate in place. The cover plate also has a pair of teeth 22 which fit into notches 54 in the base plate prior to fixing with screws (these features can be seen in the rear view of FIG. 3). Once the termination of fibers has been made, the cover plate is fitted, with the outer side wall 18 of the cover plate surrounding the peripheral wall 66 of the base plate. The reinforcing protrusions 20 serve to position the plates correctly by butting against the peripheral wall 66. The teeth 22 and notches 54 hold the cover plate in position allowing the user to subsequently fix the cover plate with screws through screw holes 24 into screw posts 64 with ease. The label holders 16 allow an icon to be clipped into place to indicate the type of module available behind for optic connection. The icon could indicate the type (SC or ST) or simply a number (eg 1, 2, or 3) for the connection module represented.

Although the cover plate has been described with an aperture 26 for an electrical module, it would be possible to provide a blanking plate to cover the aperture, or simply provide a cover plate without the aperture if fiber optic connection only is required. If electrical connection, either power or telecommunication is also required, an electrical module may be fitted to the aperture and secured to the screw sockets 26 which are of standard spacing to receive a standard module. Such a module is shown in FIGS. 7, 8 and 9.

Figure 8:
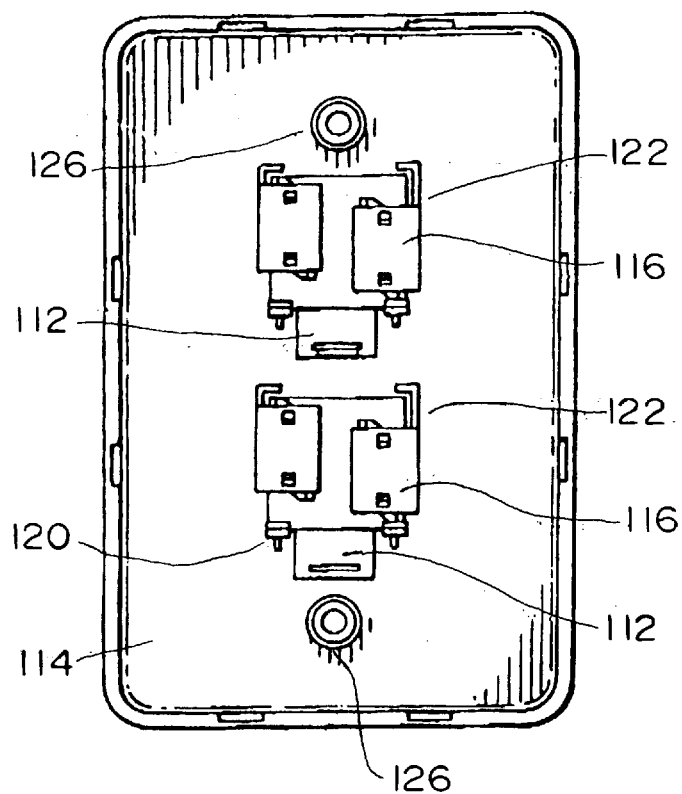
FIG. 8 is a rear view of the electrical module.
Figure 7:
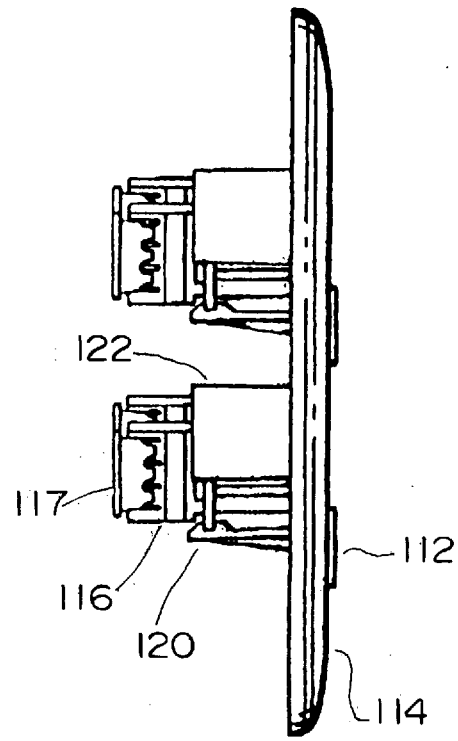
FIG. 7 is a side view of the electrical module.
Figure 9:
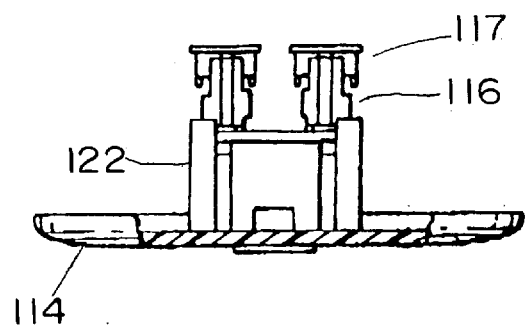
FIG. 9 is part cutaway end view of the electrical module

The module shown in FIGS. 7, 8 and 9 is a telecommunications module having four insulation displacement connectors 116 mounted in pairs on PCBs 118 which are retained by retaining walls 122 and spring tabs 120 to the module front face 114. Sockets 112 with spring wire contacts are electrically connected to the PCBs, and consequently to the IDCs, and are available at the front of the unit (FIG. 2) to receive electrical plugs, such as RJ 45 connectors. The IDCs 116 have covering caps 116.

Figure 5:
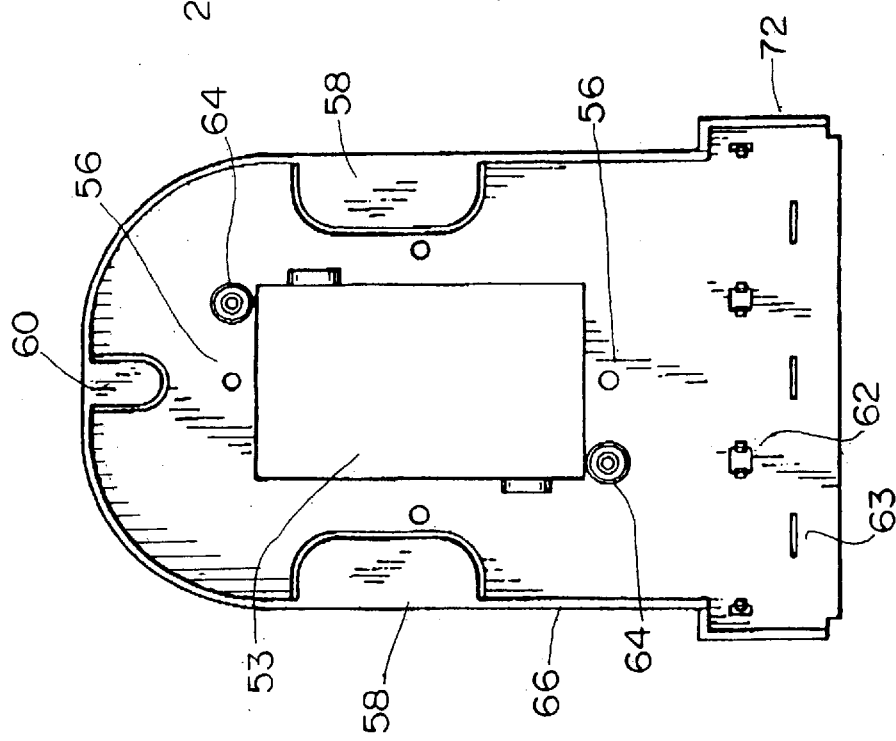
FIG. 5 is a front view of the base plate.

The provision of both electrical outlets such as sockets 112, and fiber outlets such as modules 70 is very beneficial. In the embodiment described, the unit is easily mounted to a wall, or electrical box, and has an electrical outlet easily mounted thereto which can be seen by comparing the FIGS. 5 and 6. The aperture 53 of the base plate and screw holes 56, allow the base plate to be easily mounted to an existing electrical box. Subsequently, once configured, the cover plate is mounted to the base plate by screws through holes 24 attaching to screw posts 64. Lastly, the electrical module 100 is mounted to the cover plate by screws through holes 126 passing into threaded holes 27 in the cover plate. The assembled unit, as shown in FIG. 2, provides the advantages noted above without unduly increasing the size of the outlet and remaining relatively flush with the wall.

Whilst the base plate has been described as having a rear wall with an aperture, it would be possible to provide a variation with a peripheral wall only. This and other variations which will occur to those skilled in the art are within the scope and spirit of the invention which is limited only by the claims which follow.

I claim:

1. An optical fiber connection unit comprising a base plate and a cover plate;

said base plate comprising:

a rear wall for mounting to a surface, said rear wall defining an aperture for passage of optical fibers into the unit; and a peripheral wall on said rear wall, said peripheral wall having at least one retaining means protruding therefrom for retaining optical fibers arranged on said rear wall and within said peripheral wall said peripheral wall having a curved portion having a radius of curvature corresponding to a minimum radius of curvature of an optical fiber;

wherein said base plate and said cover plate define an enclosure for retaining fibers therein for connection; and wherein said aperture defined by said rear wall is the size of a standard electrical box for convenience of mounting thereto.

2. An optical fiber connection unit according to claim 1, wherein said at least one retaining means comprises a flange.

3. An optical fiber connection unit according to claim 1, wherein said at least one retaining means comprises a pair of flanges opposably mounted on opposite portions of said peripheral wall.

4. An optical fiber connection unit according to claim 1, wherein said at least one retaining means comprises three flanges protruding from said peripheral wall, spaced from said rear wall and protruding into said enclosure.

5. An optical fiber connection unit according to claim 1, wherein said peripheral wall is at the outer perimeter of said rear wall.

6. An optical fiber connection unit comprising a base plate and a cover plate;

said base plate comprising:

a rear wall for mounting to a surface, said rear wall defining an aperture for passage of optical fibers into the unit; and a peripheral wall on said rear wall, said peripheral wall having: (a) at lease one retaining means protruding therefrom for retaining optical fibers arranged on said rear wall and within said peripheral wall, (b) at least one discontinuity to allow connection to fibers retained in the unit in use, and (c) a curved portion having a radius of curvature corresponding to a minimum radius of curvature of an optical fiber;

said cover plate comprising:

an outer face for mounting to said base plate and defining a second aperture for reception of an electrical outlet module, wherein said base plate and said cover plate define an enclosure for retaining fibers therein for connection, said first aperture and said second aperture allow the unit to be mounted to an electrical outlet box and to have an electrical connector module mounted thereto respectively, and said aperture defined by said rear wall, said outer face and said discontinuity of said peripheral wall allows connection to said optical fibers.

7. An optical fiber connection unit comprising a base plate and a cover plate;

said base plate comprising:

a rear wall for mounting to a surface, said rear wall defining an aperture for passage of optical fibers into the unit; and a peripheral wall on said rear wall having at least one discontinuity to allow connection to fibers retained in the unit in use wherein said base plate and said cover plate define an enclosure for retaining fibers therein for connection through an aperture defined by said rear wall, said outer face and said discontinuity of said peripheral wall; wherein said peripheral wall has a curved portion having a radius of curvature corresponding to a minimum radius of curvature of an optical fiber.

8. An optical fiber connection unit according to claim 7, wherein said at least one discontinuity is at the lower end of the unit in use.

9. An optical fiber connection unit according to claim 7, wherein said rear wall comprises at least one retainer adjacent said discontinuity for retention of an optical connection module.

10. An optical fiber connection unit according to claim 7, wherein said rear wall comprises four sprung tabs for reception of three optical connector modules.

11. An optical fiber connection unit according to claim 7, wherein said peripheral wall comprises a wider portion for receiving three optical connection modules adjacent one another.

12. An optical fiber connection unit comprising a base plate and a cover plate;

said base plate comprising:

a rear wall for mounting to an electrical outlet box, said rear wall defining an aperture for passage of optical fibers and electrical conductors into the unit; and a peripheral wall on said rear wall, said peripheral wall having a curved portion having a radius of curvature corresponding to a minimum radius of curvature of an optical fiber;

wherein said cover plate comprises an outer face for mounting to said base plate and defining a second aperture for reception of an electrical outlet module, wherein said base plate and said cover plate define an enclosure for retaining fibers therein for connection, and said first aperture and said second aperture allow the unit to be mounted to an electrical outlet box and to have an electrical connector module mounted thereto respectively.

13. An optical fiber connection unit according to claim 12, wherein said aperture of said rear wall is the size of a standard electrical box and said second aperture is the size of a standard electrical module.

* * * * *